Sept. 16, 1924.

P. O. NOBLE

1,508,711

APPARATUS FOR ARC WELDING

Filed July 27, 1921  5 Sheets-Sheet 1

Inventor:
Paul O. Noble,
by Albert G. Davis
His Attorney.

Sept. 16, 1924.  
P. O. NOBLE  
APPARATUS FOR ARC WELDING  
Filed July 27, 1921

Inventor:
Paul O. Noble,
by Albert G. Davis
His Attorney.

Sept. 16, 1924.
P. O. NOBLE
1,508,711
APPARATUS FOR ARC WELDING
Filed July 27, 1921
5 Sheets-Sheet 4

Inventor:
Paul O. Noble,
by Albert G. Davis
His Attorney.

Sept. 16, 1924.

P. O. NOBLE 1,508,711

APPARATUS FOR ARC WELDING

Filed July 27, 1921  5 Sheets-Sheet 5

Inventor:
Paul O. Noble,
by Albert G. Davis
His Attorney.

Patented Sept. 16, 1924.

1,508,711

UNITED STATES PATENT OFFICE.

PAUL O. NOBLE, OF SCHENECTADY, NEW YORK, ASSIGNOR TO GENERAL ELECTRIC COMPANY, A CORPORATION OF NEW YORK.

APPARATUS FOR ARC WELDING.

Application filed July 27, 1921. Serial No. 487,875.

*To all whom it may concern:*

Be it known that I, PAUL O. NOBLE, a citizen of the United States, residing at Schenectady, in the county of Schenectady, State of New York, have invented certain new and useful Improvements in Apparatus for Arc Welding, of which the following is a specification.

My invention relates to electric welding of the type known as metallic arc welding wherein the arc is maintained between a fusible metallic electrode and the work toward which it is continuously fed as it is consumed.

Hand welding as commonly practiced requires a considerable degree of skill on the part of the welder merely to hold the arc. If the electrode is fed toward the work faster than it is consumed the molten end of the electrode will touch the work and usually adhere so firmly as to require considerable effort to free it. If the electrode is not fed as fast as it is consumed the arc will lengthen until it breaks. In either case a more or less defective spot is produced in the weld. Moreover, it is not sufficient for the operator merely to keep between the limits set by the touching of the work and the breaking of the arc. It is now well established that satisfactory welding requires a very short arc, much shorter than may be held without interruption of the circuit. With bare wire electrodes $\frac{3}{16}''$ in diameter the arc should not exceed $\frac{1}{16}''$ in length. With normal welding currents this electrode will be consumed at a rate of approximately eight inches per minute. Electrodes of smaller size require a shorter arc and the rate of consumption of the electrode increases as the diameter of the electrode is reduced. With an electrode $\frac{1}{16}''$ in diameter the arc should not exceed $\frac{1}{16}''$ in length and the electrode will be consumed at the rate of about 18 inches per minute. The difficulty of manually holding the proper arc length and at the same time moving the electrode over the work as the welding progresses will be readily appreciated. It is moreover apparent that the difficulty of hand welding becomes increasingly difficult as the diameter of the electrode is reduced. In fact the skill of the operator is such a great factor in determining the success or failure of electric arc welding, that it is the custom of many manufacturers interested in this line of work to establish welding schools wherein persons are instructed and trained to become competent welders. Such mechanical knowledge as is necessary for proper preparation of the work is readily acquired by the ordinary individual but a natural aptitude is requisite to the development of an expert welder. So many individuals, otherwise competent, have failed to qualify even after a long course of training that it is customary to place such persons on other work if they fail to show a fair degree of ability after a short course of training. Hand arc welding as commonly practiced is, moreover, very wasteful of electrode material in that the electrodes are customarily used in lengths of about 14 inches which are clamped in the electrode holder. It is impossible to use up such pieces completely since a piece shorter than two inches cannot be clamped in the holder and used. There is, moreover, a considerable waste of material by reason of the fact that even the most skilled operators occasionally touch the hot electrode to the work to which it often adheres so firmly as to cause the piece of electrode to become so badly bent in wrenching it loose that it cannot be further used. Experience shows that about 20% of the electrode material is wasted in hand welding as customarily practiced. This means a very considerable expense for the reason that electrode material is comparatively expensive.

Automatic arc welding machines which continuously feed a welding electrode to the work and sensitively control the rate of feeding in accordance with the voltage across the arc to maintain the arc length constant, have been developed to a high degree of perfection. These machines, however, are quite large and heavy and impossible of manual manipulation over the work. Such machines, therefore, have their greatest utility in production work where a large number of articles of the same character require substantially the same welding operation. Furthermore such apparatus requires adjustment to accommodate different kinds of work and in many cases the work is of such a character that a special machine must be designed to accommodate it effectively.

An object of my invention is to provide means which shall extend the field of operation of automatic arc welding machines of the class described so that the welding may be done at any point in the vicinity of the machine, at the same time retaining all of the advantages of continuous feed of the electrode with automatic control of the arc length.

A further object of my invention is to provide an apparatus for hand welding which shall continuously feed the electrode toward the work, thereby making it unnecessary for the operator to move the welding tool toward the work as the electrode is consumed.

Further objects of my invention are to provide apparatus for hand welding which shall be economical in the use of electrode material, eliminate the time ordinarily consumed in changing electrodes, reduce to a minimum the skill and training required of the operator, and permit the operator to devote his undivided attention to the matter of directing the arc stream so as to form the weld.

My invention will be better understood from the following description taken in connection with the accompanying drawings, and its scope will be pointed out in the appended claims.

In the accompanying drawings

Figures 1, 2:
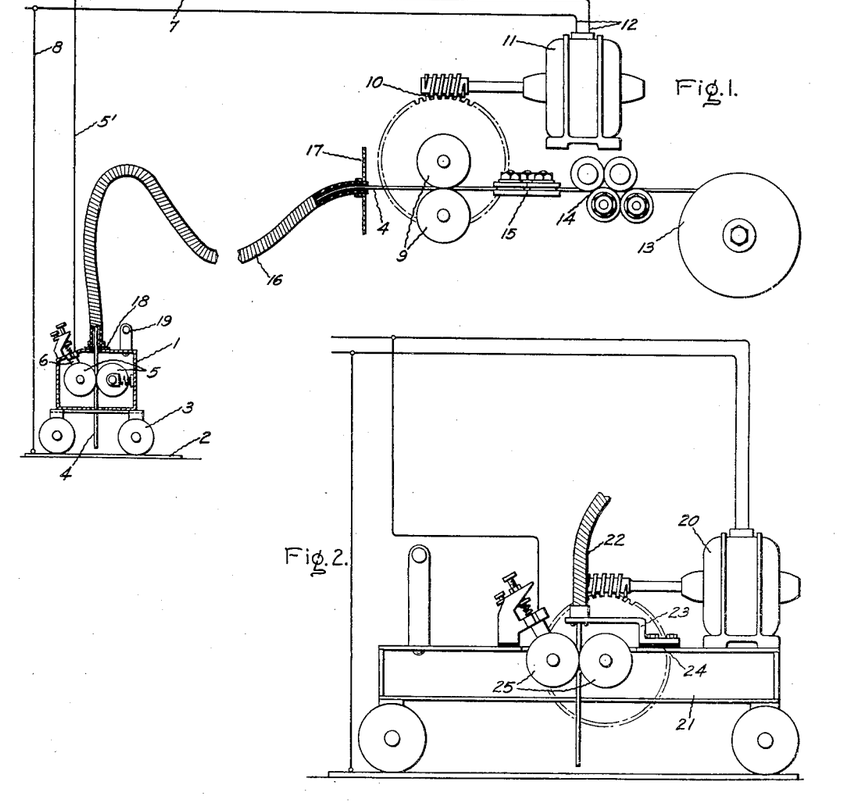
Figs. 1, 2, 3 and 4 are diagrammatic representations of welding systems and apparatus arranged according to my invention.

Referring to Fig. 1, 1 represents a welding tool adapted to be moved over the work 2 either manually or by any well known automatically operated mechanism. In this figure the welding tool is represented as provided with wheels or rollers 3 which may move along the work. The welding arc is maintained between the electrode 4, which is adapted to be continuously fed through the welding tool by any suitable mechanism hereinafter described and the work 2. Means represented as contact rollers 5, are arranged to engage the welding electrode and conduct the welding current into the same at the welding tool. In the drawing conductor 5' is diagrammatically represented as leading current to a brush 6 in engagement with one of the rolls 5. The work 2 is represented as connected to the other side of the welding circuit 7 by the conductor 8. In order to prevent short circuiting of the arc where the welding tool is made of conducting material and the parts thereof are alive during the welding, the wheels 3 should be made of insulating material or mounted in insulating bearings. The welding electrode 4 is continuously fed toward the work, as it is consumed by the welding current, by electrode feeding mechanism represented in Fig. 1 as comprising electrode feed rollers 9 driven through suitable gearing 10 from the motor 11 which is diagrammatically represented as connected across the welding circuit conductors 5' and 8 by the leads 12. The electrode 4 is represented as being fed from the electrode carrying reel 13 which may carry a large supply of electrode material. The electrode passes from the reel 13 through straightening rolls 14 and 15 to the feed rolls 9. In order to permit of the welding tool being moved about independently of the position of the electrode feeding mechanism and reel 13 I provide a flexible electrode guide tube 16 secured in cooperative relationship to the electrode feeding mechanism to receive the electrode from said feeding mechanism and guide it to the welding tool 1. The guide tube 16 is represented in Fig. 1 as being secured to a plate 17 which may be any suitable part of the device upon which the electrode feeding mechanism is mounted. The other end of the tube 16 is secured at 18 to the welding tool. Where the welding tool is manually operated over the work a suitable handle or handles 19 may be provided if desired.

When welding with an apparatus constructed in accordance with the showing in Fig. 1 the length of the arc is automatically maintained constant by the electrode feed mechanism. The speed of the feed motor 11 varies upon any tendency of the arc length to vary since the speed of the motor is dependent upon the voltage across the arc which voltage is proportional to the arc length. The idea of means for continuously feeding an electrode to the work and varying the rate of feed in accordance with the voltage at the arc to keep the arc length constant is claimed broadly in my copending application Serial No. 323,170, filed Sept. 11, 1919, for methods and apparatus for electric arc welding. Such an apparatus is described in British Patent No. 139,919 to the British Thomson-Houston Company, Ltd. In such an apparatus, however, the welding electrode is fed directly from the electrode feeding mechanism to the work which must be located adjacent the point of delivery of the electrode from the feeding mechanism. According to the present invention flexible electrode guiding means are provided which guide the electrode to the place where the welding is to be done, and this flexible guiding means enormously increases the field of operation of automatic arc welding since the welding tool may be operated to perform welding at any place in the vicinity of the machine. The electrode guiding tube may be of indefinite length and I have found no difficulty whatever in using a guide tube from 10 to 15 feet long and undoubtedly even longer tubes may be used if desired. I have found it unnecessary to exercise care to keep the tube straight, on the contrary, the electrode tube may have several curves therein without affecting the operation in the slightest degree. While there is an indefinite length of electrode in the electrode guide tube, the length of electrode carrying the welding current is very short since according to my invention I lead the welding current into the electrode at the welding tool.

My invention is not limited to an arrangement in which the electrode is pushed through the tube by the electrode feeding mechanism but in its broadest aspects also covers an arrangement in which the electrode feeding mechanism is mounted on the welding tool and the electrode pulled through the tube from the source of electrode supply. The electrode reel, when filled with electrode, weighs 200 pounds or over and such reel may be located wherever desired and the electrode guided by the flexible tube from the reel to the welding tool which may move about the work independently of the reel. Such an arrangement is diagrammatically represented in Fig. 2 where the feed motor 20 is mounted upon the carriage 21. The electrode guide tube 22 is represented as secured to the bracket 23 mounted upon the carriage 21 and insulated therefrom at 24. The electrode feed rolls are shown at 25 and the circuit connections are represented as identical with those of Fig. 1. Where the bracket 23 is insulated and the bearings for the guide rolls 25 are insulated from the carriage, it becomes unnecessary to insulate the wheels of the carriage from the work.

Figure 3:
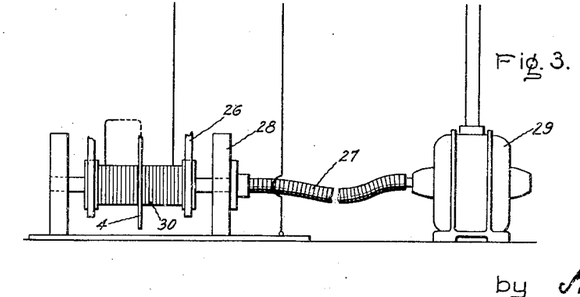

It will be understood that my invention is not limited to any particular type of welding tool or carriage and it will also be understood that the welding tool may be moved with respect to the work or the work moved with respect to the carriage. Fig. 3 diagrammatically represents an arrangement in which the carriage is moved over the work by means of a flexible shaft driven from a stationary work traversing motor. In this figure a part of the welding carriage is indicated at 26 and a flexible shaft 27 is arranged to drive the wheels 28 of the carriage. The traversing motor is represented at 29. It will, of course, be understood that the flexible shaft 27 may be geared to the carriage in any suitable way so that the shaft leads from the machine in such a way as to interfere as little as possible with the free movement of the carriage. In order to hold the carriage firmly to the work the wheels and shaft may be made of magnetic material and the welding current led through a winding 30 mounted upon the shaft.

Figure 4:
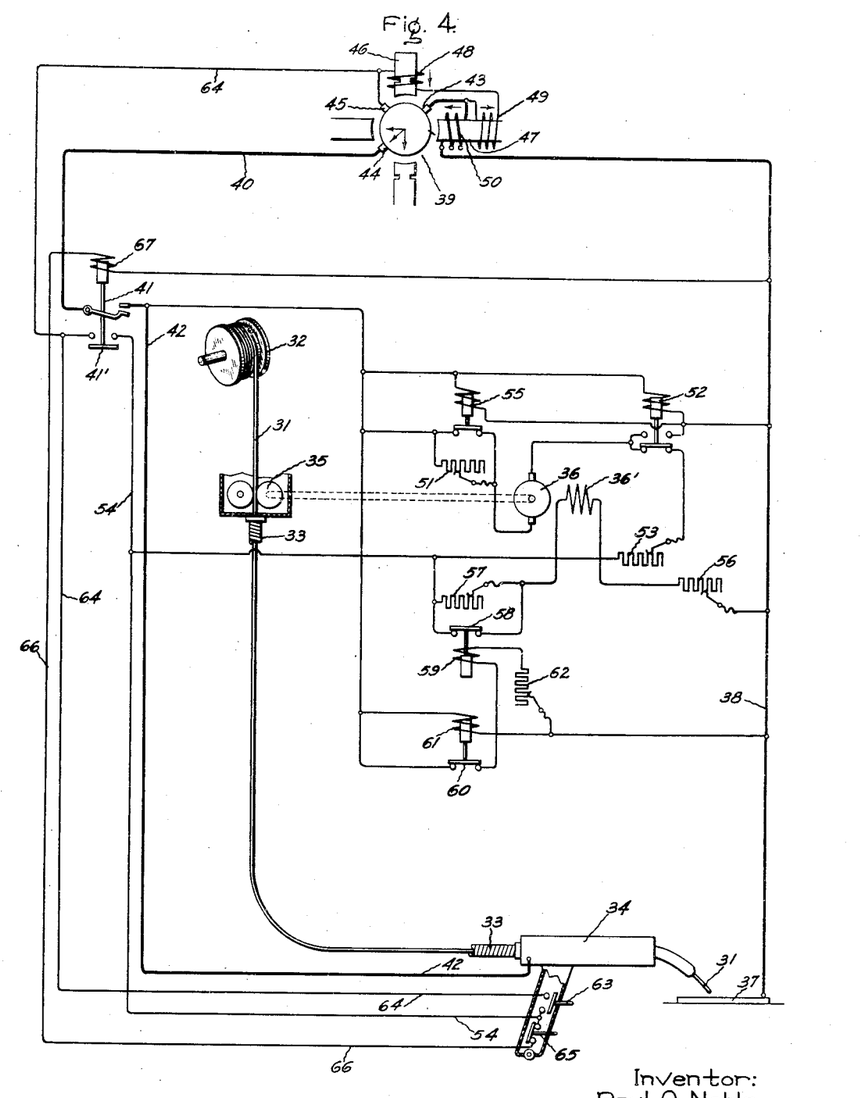

Fig. 4 represents a welding system embodying my invention in which the metallic electrode 31 is fed from the reel 32 through the flexible guide tube 33 to the welding tool 34 which is here represented as a light portable tool adapted to be held in the hand of the operator as in ordinary hand welding. As distinguished from ordinary hand welding, however, the operator is relieved of the necessity of feeding the tool toward the work as the electrode is consumed, since the electrode is automatically fed through the tool and the arc length maintained constant by the automatic electrode feeding mechanism. This electrode feeding mechanism is here shown as comprising a pair of electrode feed rolls 35 driven from a motor 36. The work 37 is connected by the lead 38 to one terminal of the source of welding current 39, the other terminal of which is connected by the lead 40 through contactor 41 to the lead 42 which is connected to lead current into the electrode 31 at the welding tool. The welding source 39 diagrammatically represents a generator constructed in accordance with the patent to Bergman No. 1,340,004, May 11, 1920. This generator comprises main brushes 43 and 44 connected to the welding circuit and an auxiliary brush 45. One pair of poles 46 are arranged to be saturated and a second pair of poles 47 to be unsaturated during the normal operation of the machine. The arrangement is such that the voltage between the brushes 43 and 45 is produced by the saturated poles 46 only, while the voltage between brushes 43 and 44 is produced by the flux of both the saturated and unsaturated poles. Since the machine is a constant speed machine it is apparent that the voltage between brushes 43 and 45 is constant. Exciting windings 48 and 49 supplied from the constant voltage brushes 43 and 45 are arranged upon the poles 46 and 47 respectively and in the direction of winding is such that the magnetomotive forces tend to produce fluxes and electromotive forces in the same direction between brushes 43 and 44. An adjustable differential series winding 50 carrying the welding current is arranged upon poles 47. The armature reaction of the generator is arranged so that the component thereof in line with poles 47 assists the winding 50 and so that the component thereof in line with poles 46 assists the winding 48. It is apparent that variations in the welding current have little effect upon the flux in the line of poles 46, since these poles are saturated during normal operation, and it is apparent that variations in the welding current have a very marked effect upon the flux in the line of poles 47 since these poles are always undersaturated. The windings are preferably so designed that with no current flowing in the welding circuit the voltage between brushes 43 and 44 will be that necessary for striking the arc and so that at a certain value of load current, preferably about half load, the resulting flux in poles 47 will be zero. At such a load the voltage between brushes 43 and 44 is equal to the voltage between the brushes 43 and 45. When the welding current increases above this value the flux in poles 47 builds up in the opposite direction so that the voltage between brushes 44 and 45 increases but with opposite polarity to that between brushes 43 and 45. Therefore, the voltage between brushes 43 and 44 is equal to the voltage between 43 and 45, less the voltage between brushes 44 and 45. When the welding circuit is short circuited the voltage between brushes 44 and 45 is substantially equal to the voltage between brushes 43 and 45 and opposed thereto. It is thus seen that the voltage between the welding circuit brushes 43 and 44 is the algebraic sum of the voltage between brushes 43 and 45 and the voltage between brushes 44 and 45, while the voltage between brushes 43 and 45 is at all times constant.

In the system shown in Fig. 4, the electrode feed motor 36 is arranged not only to control the arc length during normal welding but is also arranged to reverse the direction of electrode feed to strike the arc. The control circuits shown are the same as those shown in my copending application Serial No. 376,448, filed April 26, 1920, assigned to the assignee of this application. One terminal of the motor 36 is connected through resistor 51 to the main 42. The other terminal of motor 36 is arranged to be connected by double throw contactor 52 either directly to the positive main 38, or through an adjustable resistor 53, to the conductor 54 which is supplied from the brush 45 of generator 39 when the contact 41' is closed. The operating winding of contactor 52 being connected across the welding circuit causes current to flow through the armature of the motor 36 in a direction to cause the motor to feed the electrode toward the work whenever the voltage is above the desired normal arc voltage, and causes the current to traverse the motor armature in the reverse direction to feed the electrode away from the work whenever the voltage is below that sufficient for welding, as, for example, when the electrode is touched to the work. A relay 55 provided with a winding connected across the welding circuit is arranged to insert resistor 51 in the circuit of the armature of motor 36 whenever the arc voltage is abnormally high. For example, where the open circuit voltage is 60 volts this winding may be arranged to operate at about 40 volts. The resistor 51 is provided as a protective means for the armature of the feed motor which is designed to operate normally with an impressed voltage of from 10 to 18 volts. The field winding 36' of the feed motor is connected across the constant voltage mains 38 and 54 through an adjustable resistor 56. A vibratory regulator comprising an adjustable resistor 57 and a contact 58 controlled by a coil 59 is arranged to vary the field strength of the electrode feed motor 36, in accordance with variations in voltage across the welding arc. To accomplish this function the coil 59 is connected across the welding circuit 38—42. A contact 60 controlled by coil 61 connected across the welding circuit is arranged in circuit with coil 59 to interrupt the circuit of this coil whenever the arc voltage is abnormally high. During normal operation contact 58 vibrates rapidly to control the effective resistance of the resistor 57 and thereby the field strength and speed of the motor 36 in a manner well known to those skilled in the art of vibratory regulators. An adjustable resistor 62 is arranged in the circuit of coil 59 to permit of the adjusting of the voltage at the welding arc.

The operation of the system shown in Fig. 4 is as follows:—Assuming that the generator is in operation the operator to begin welding closes the normally open push button 63 on the welding tool to complete a circuit from brush 45 through the lead 64 and the normally closed push button 65, and the lead 66 to the operating winding 67 of the contactor 41. Contactor 41 in closing closes the interlocked contact 41' which completes a shunt around push button 63 which may, therefore, be opened without deenergizing the winding 67. The voltage now impressed on the welding circuit 38 and 42 causes contactor 52, relay 55 and contact 60 to move to their upper positions. Relay 55 thus inserts the protective resistor 51 into the armature circuit of motor 36. Contactor 52 completes a circuit through the armature of the electrode feed motor to operate the same in a direction to feed the electrode toward the work. At this time the field 36' of electrode feed motor is strongly energized since resistor 57 is short circuited by contact 58, coil 59 being open circuited at contact 60. The feed motor, therefore, operates slowly to feed the electrode slowly toward the work and at the moment of engagement between the electrode and the work the welding circuit 38 and 42 is short circuited. The inherent operation of the generator acts to limit the short circuited current. The voltage of the welding circuit being now practically zero, contactor 52, relay 55 and contact 60 move to their lower positions.

Contactor 52 now completes a circuit to operate the feed motor in the reverse direction to withdraw the electrode from the work and strike the arc. By adjusting the value of resistor 53 the backing away speed of the electrode feed motor may be adjusted to any desired value. As soon as the welding arc is struck contactor 52 is energized sufficiently to move its core to the upper position and reconnect the armature of the feed motor 36 across the welding circuit 38-42 for operation in a direction to feed the electrode toward the work to compensate for the consumption of the electrode by the welding current. The voltage across the welding circuit is too low to operate the relay 55 and the resistor 51 consequently remains short circuited so that the full voltage of the welding circuit is impressed across the armature of the feed motor. The normal welding voltage is also insufficient to open the contact 60 and the winding 59 of the vibratory regulator consequently remains connected across the arc. The vibratory action of the contact 58 controls the speed of operation of the feed motor with great sensitiveness so that the length of the welding arc is maintained constant with a high degree of accuracy. Since the electrode guide tube 33 is flexible the operator can move the welding tool freely to any desired position. Welding may be done on the upper or under surfaces or along the edges of the article to be welded and since the electrode traverses the holder longitudinally the arrangement is peculiarly adapted to weld in corners and in the inside of hollow articles since the electrode arc stream may be directed upon the work as easily as a stream of water might be directed from a flexible hose.

Figure 5:
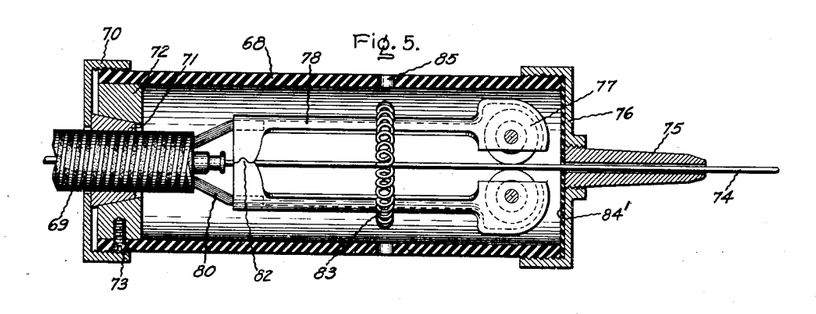
Fig. 5 is a view partly in section showing a welding tool.
Figure 6:
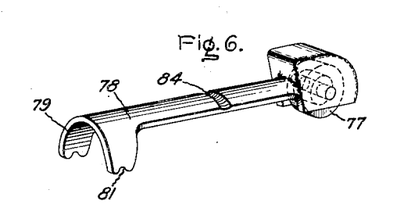
Fig. 6 is a perspective view of one of the parts of the welding tool shown in Fig. 5.

Fig. 5 represents a welding tool adapted to be manually held. This tool comprises a body portion represented as a cylindrical tube 68 of insulating material. The electrode guide tube is represented at 69. This guide tube may have the conductor for leading the welding current to the tool braided thereupon as shown more clearly in Fig. 7, hereinafter described. The tube 69 is represented as secured in the tool by means of a clamping nut 70 threaded upon the tube 68 and arranged to force wedging blocks 71 between the tube 69 and the member 72 secured inside the tube 68 by screws 73. The electrode 74 passes longitudinally through the tool and through an electrode delivery nozzle 75 secured in an end piece 76 threaded upon the end of tube 68. While the nozzle 75 and piece 76 might be made integral it is preferable to thread the nozzle 75 into the part 76 so that the expense of replacement of damaged nozzles is reduced. Current is led into the electrode 74 at the tool by means of contact rolls 77 which may be two or more in number, two being shown. In order to reduce the size of the apparatus, it is desirable to make the contact rolls quite small and tungsten rolls bushed with bearings of self lubricating material are desirable since the tungsten rolls are well adapted to withstand the abrasive action of the metallic electrode and also well adapted to withstand any slight arcing that may be produced because of an occasionally poor contact with the electrode. As shown more clearly in Fig. 6 each contact roll 77 may be mounted in a pivoted arm 78 of brass or copper which may be provided with a semi-circular portion 79 at the rear to which the welding current conductor 80 may be secured in any suitable manner. If desired, grooves may be provided in this portion of the arm and the conductor soldered in such grooves. The two arms 78 shown in Fig. 5 are arranged to pivot upon each other at the end opposite the contact rolls and if desired one of the arms may be provided with grooves 81 which cooperate with projections 82 on the other arm. The arms are preferably spring pressed together and such spring pressure may be provided by means of a spiral spring 83 encircling both arms and held in place by grooves 84 in the arms. The device may be assembled by removing the cap piece 76 and sliding the nut 70 and tube 68 over the electrode guide tube 69. The contact arms 78 may then be secured to the conductor 80 after which the tube 68 may be slid forward to enclose the arms 78 and contact rolls. The nut 70 may then be tightened to clamp the holder to the electrode guide tube. The cap piece 76 may then be screwed into place. An insulating washer 84' such as mica will preferably be clamped between the end of the tube 60 and the cap piece 76 to prevent the current from passing directly from the arms 78 to the metal cap piece 76, if it should happen that sufficient clearance is not left between the ends of the arms 78 and the cap piece. Preferably, however, a substantial clearance will be left to permit of the arms 78 being freely pressed together by the spring 83 to make good electrical contact with the electrode. Holes 85 may be provided in the tube 68 to secure a circulation of air through the holder to keep the spring 83 cool.

Figures 7, 7A, 8, 9, 13:
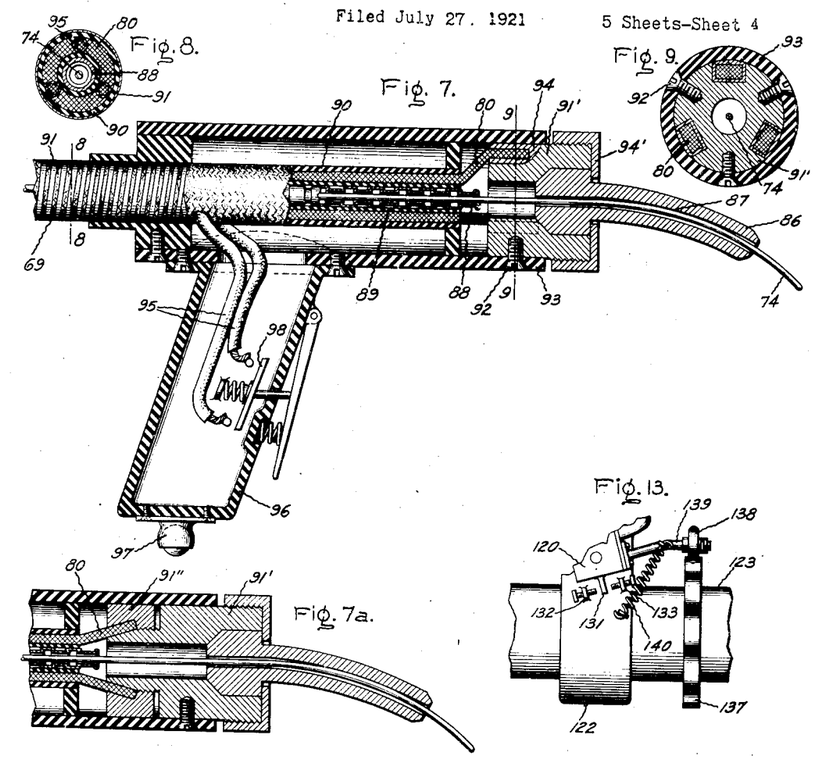
Fig. 7 shows a modified form of welding tool and illustrates the electrode guide tube construction.
Fig. 7a shows a detail modification of the tool shown in Fig. 7.
Figs. 8 and 9 are sections on the lines 8—8 and 9—9 respectively of Fig. 7.
Fig. 13 shows a modification of the apparatus shown in Fig. 12.

Fig. 7 shows a modified construction of the welding tool which permits of the elimination of the contact rolls and thereby renders it possible to make the tool considerably smaller in diameter. In this construction the electrode 74 is forced through a nozzle 86 which is curved so that the electrode firmly engages the tube at 87 to make a good electrical contact therewith. The electrode guide tube 69 is here shown partly in section and comprises a flexible metallic hose 88 preferably made of spirally wound steel tape or other material sufficiently hard to withstand the abrasive action of the electrode passing therethrough. Such a tube will remain of substantially constant length although the electrode feeding mechanism will readily compensate for slight changes in the length of the tube should the same tend to stretch. In order to make it unnecessary to use conductors separate from the tube for leading the welding current into the electrode I preferably braid the flexible conductor 80 upon a layer of insulation 89 applied to the tube 88. A layer of insulation 90 surrounds the conductor 80 and any suitable metallic armor 91 is applied to the exterior of the tube. The conductor 80 is secured in any desired manner to the conducting piece 91' secured by the screws 92 in the end of the insulating sleeve 93 forming the body portion of the tool. In the drawing the strands of the conductor 80 are represented as secured in grooves in the piece 91', for example, by solder 94. This construction is clearly shown in Fig. 9. The electrode delivery nozzle 86 is arranged to be pressed into firm conducting contact with the piece 91' by means of the cap 94' screwed to the piece 91'. By loosening the cap piece 94' the nozzle 86 may be turned to deliver the electrode in any desired direction after which the cap piece 94' may be tightened to clamp the nozzle in its new position. The end of the welding tool becomes quite hot with continued use and to avoid the use of soldered connections which might become loose owing to the softening of the solder any suitable means may be used for mechanically fastening the conductor 80 to the piece 91'. An example of such a mechanical connector is illustrated in Fig. 7ª wherein the piece 91' is provided with a tapered portion which coacts with a correspondingly tapered piece 91'' which is threaded onto the piece 91' to clamp the conductor 80 firmly in place. The curved nozzle means for leading current into the electrode is claimed in the application of Charles E. Glasser, Serial No. 502,625, filed September 23, 1921, assigned to the assignee of this application.

Fig. 8 shows a section of the electrode guide tube taken on the line 8—8 of Fig. 7. The use of a stranded conductor 80 braided upon the tube renders the tube quite flexible and if desired the control wires 95 may be braided onto the tube along with the stranded conductor for the welding current. Fig. 8 shows three such control wires which correspond to the conductors 54, 64 and 66 of Fig. 4. Fig. 7 also shows one manner of applying a pistol grip 96 to the welding tool. If desired this grip may be provided with a castor 97 which may be used to steady the welding tool while it is moved along the work whenever the work presents an opportunity to steady the welding tool. In Fig. 7 the welding tool is provided with a single contact 98 for completing the circuit of two of the control wires which may lead to a remotely controlled contactor controlling the welding circuit.

Figure 10:
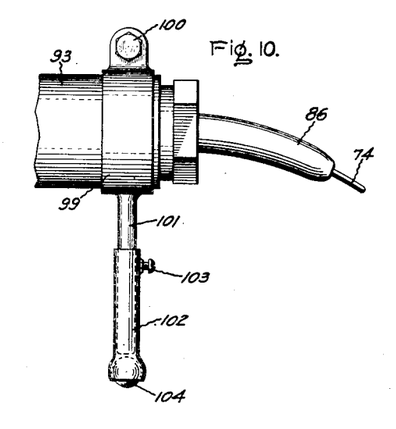
Fig. 10 shows a steady rest applied to the welding tool.

Fig. 10 shows how a steady rest may be applied to the end of the welding tool where desired. This steady rest comprises a clamp 99 which may be clamped in any desired position on the body portion of the tool by a bolt 100. The clamp is provided with a projection 101 which may be secured in any desired position in the part 102 by means of the screw 103. The length of the steady rest may thus be adjusted. A castor 104 may be provided if desired at the end of the steady rest.

Figure 11:
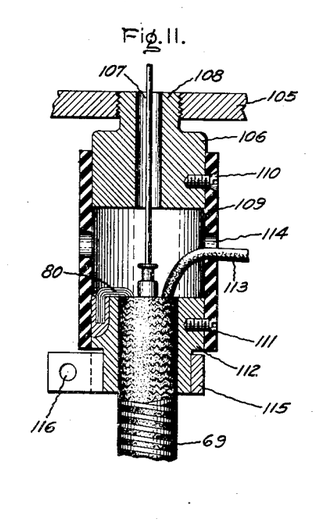
Fig. 11 shows the method of supporting the end of the electrode guide tube into which the electrode passes and illustrates a method of leading current into a conducting cable braided upon the guide tube.

Fig. 11 illustrates how the other end of the electrode guide tube may be secured. In this figure 105 indicates a part of the frame to which the tube is to be secured. The member 106 provided with an opening 107 through which the electrode passes is provided with a threaded projection 108 to engage the frame 105. A cylindrical member 109 is secured by screws 110 to the member 106 and by screws 111 to the copper member 112 into grooves in which the welding conductor 80 may be soldered. One of the control wires 113 is indicated as being led through an opening 114 in the side of the member 109. The welding current is led into the welding conductor 80 by means of a clamp 115 clamped onto the member 112 by means of a bolt passed through openings 116 in the wings of the clamp.

Figure 12:
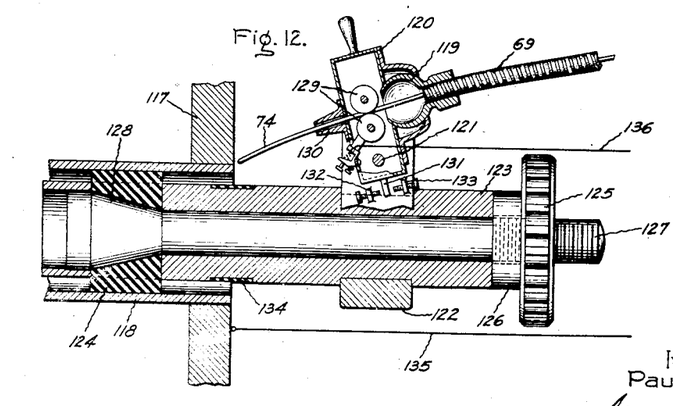
Fig. 12 shows an embodiment of my invention particularly adapted for boiler flue welding.

Fig. 12 represents an embodiment of my invention particularly designed for flue welding. In this figure the flue sheet is represented by 117 and the flue to be welded thereto at 118. The electrode guide tube 69 is represented as secured by a ball and socket joint 119 to the frame 120 pivoted at 121 upon a member 122 arranged to rotate upon the member 123 which is secured in the flue. To secure the member 123, insulating blocks 124 located in grooves in member 123 are provided with tapered surfaces so that upon turning up the nut 125 against the washer 126, bearing on the member 123, the bolt 127, provided with a taper end 128, forces the blocks 124 against the inside of the tube. The frame 120 is provided with contact rolls 129 for leading current into the electrode 74 and an electrode delivery nozzle 130 is preferably provided to guide the electrode as it is delivered through the contact rolls. The frame 120 is preferably provided with a projection 131 arranged to move between the adjustable stops 132 and 133 secured to the member 122. The arc will preferably be started on the flue sheet and the electrode 74 then moved so as to cause the arc to play upon the joint to be welded. The stops 132 and 133 may be adjusted so that this movement of the electrode may be easily accomplished without care on the part of the operator. After the arc has been started the member 122 will be rotated upon member 123 to weld the flue to the flue sheet. It is, of course, immaterial as far as my invention is concerned whether the member 122 is rotated manually or by means of a spring motor or other motor. In order to protect the member 123 from the heat of the arc a heat resisting insulation 134 is preferably provided upon the member 123 adjacent to the end of the flue. One conductor leading the welding current to the flue sheet is shown at 135 and the other conductor for leading current from the contact rolls is shown at 136.

Fig. 13 shows a modification of the apparatus shown in Fig. 12, comprising means for oscillating the electrode across the line of the weld while the electrode carrying means is being rotated to cause the welding arc to follow the joint to be welded. To accomplish this result a cam 137 is secured upon the member 123 and a roller 138 mounted upon an arm 139 secured to the frame 120, is arranged to bear upon this cam. A spring 140 is provided for causing the roller to bear continually against the cam surface. As thus arranged the rotation of the member 122 carrying the frame 120 causes the tip of the electrode 74 to oscillate transversely to the line of the weld. When arranged for this oscillatory movement the stops 132 and 133 will be adjusted so as to permit free movement of the frame 120. When it is not desired to use the oscillating mechanism the cam 137 may be moved back on the member 123 so as to be out of contact with the roller or if desired the cam may be left in place and the roller 138 removed and the spring 140 disconnected. The stops 132 and 133 may then be adjusted to permit of the operation described in connection with Fig. 12.

Figure 14:
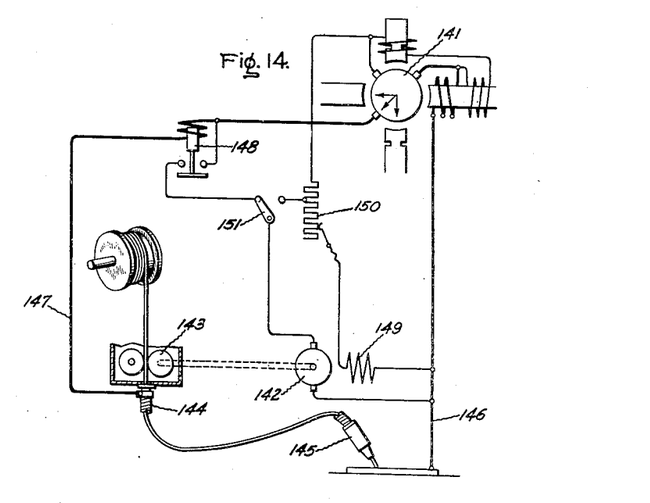
Fig. 14 shows a somewhat more simple form of welding system than that shown in Fig. 4.

Fig. 14 shows a welding system in which the control circuits are simplified. In Fig. 4 means were provided for causing the electrode feed motor to reverse its operation to strike the arc. This feature is, however, not at all essential where the welding tool is manually held since the operator may strike the arc by merely touching the electrode to the work and withdrawing it as in ordinary hand welding. Fig. 4 also illustrates a vibratory regulator for controlling the operation of the electrode feed motor, in accordance with the voltage across the arc. In Fig. 14 the vibratory regulator is omitted. In Fig. 14 the welding generator 141 is identical with the welding generator 39 of Fig. 4. The armature 142 of the electrode feed motor drives the feed rolls 143 which feed the electrode through the flexible tube 144, to the welding tool 145. The welding circuit mains 146 and 147 are connected respectively to the work and to the conductor associated with the flexible tube 144. The armature 142 of the feed motor is connected directly across the welding circuit upon the closing of the contactor 148 which is energized by the welding current. The field winding 149 of the electrode feed motor is connected across the constant voltage brushes of the generator through an adjustable resistor 150. A switch 151 is provided which in one position connects the armature of the feed motor across the welding circuit and in the other position connects it across the constant voltage brushes of the generator through a resistor which is here shown as part of the resistor 150 in the field circuit of the motor.

In order to start the arc with the system shown in Fig. 14 the operator touches the electrode to the work which causes the operation of contactor 148 which completes the circuit of the electrode feed motor 142 which thereafter feeds the electrode at a rate to keep the arc length substantially constant. Any increase in the arc length raises the voltage on the armature of the feed motor causing it to run faster and any decrease in the arc length lowers the speed of the feed motor. To stop welding the operator merely moves the welding tool 145 quickly away from the work to break the arc. A switch 151 is provided when it is desired to operate the feed motor while the welding circuit is open. For example, if it is necessary to thread a new electrode through the tube 144 the switch 151 will be thrown to connect the armature 142 of the feed motor across the constant voltage brushes of the generator. This will start the motor into operation to feed the electrode through the tube. When this has been done the switch 151 will be thrown to the position for normal operation. The purpose of using a resistor in circuit with the armature of the feed motor when it is connected across the constant voltage brushes is merely to provide a slow speed of operation. While any other resistor might be used a portion of the resistor 150 is used merely to reduce the number of parts necessary for the apparatus.

Figure 15:
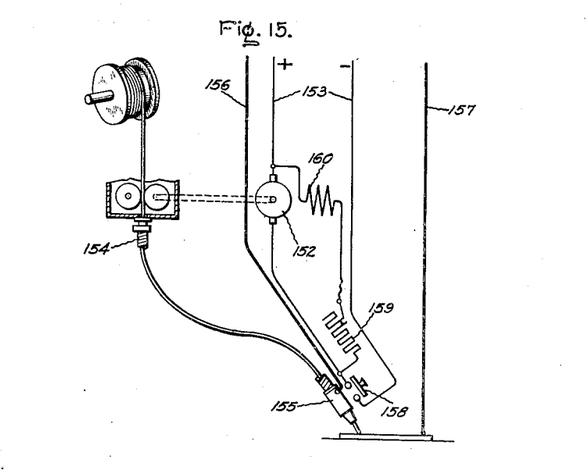
Fig. 15 shows a still simpler system in which there is no automatic control of the rate of electrode feed.

Fig. 15 shows a still further simplification of the apparatus in which the electrode feed motor 152 is connected across the constant voltage mains 153 so that its speed of operation is constant and not dependent upon the arc length. The electrode is fed through the flexible tube 154 to the welding tool 155. The mains of the welding circuit are represented at 156 and 157 and as indicated in this figure the main 156 runs to the welding tool 155 independently of the flexible tube 154 although, as heretofore pointed out, the welding conductor may be mounted upon the flexible tube is desired. To operate the system shown in Fig. 15 the operator merely closes the push button 158 which may be located on or adjacent to the welding tool 155. This sets the feed motor into operation and the operator strikes the arc in the manner usual in hand welding. Since there is no automatic control of the rate of electrode feed the operator must move the tool toward or from the work so as to compensate for changes in the arc length but the movement required on the part of the operator will be slight since the electrode is continuously fed through the tool by the feed motor. If the operator observes that the rate of electrode feed is too rapid so that the amount of electrode projecting from the tool is increasing he merely adjusts the speed at which the electrode feeding mechanism operates. While this might be done by adjustable speed gearing between the motor armature and feed rolls, means are represented in Fig. 15 for varying the speed of the feed motor. This means is represented as an adjustable resistor 159, which may be located on or adjacent the welding tool, connected in the field circuit 160 of the electrode feed motor. This resistor may be manually adjusted whenever desired to vary the rate of electrode feed. If the operator does not desire to have the electrode continuously fed to the work he may operate the feed motor long enough to project a short length of electrode through the welding tool and then stop the feed motor. He may then proceed as in ordinary hand welding until this length of electrode is consumed, after which he may again energize the feed motor to feed out an additional amount of electrode. In this way there is no waste of the electrode material such as occurs in hand welding as now practiced wherein short lengths of electrode are clamped in a welding tool. Such electrodes are ordinarily about 14 inches long and it is impossible to use them completely since a certain length of the electrode is necessary to enable the same to be clamped in the welding tool. While the arrangement shown in Fig. 15 does not secure the advantages of automatic control of the arc length, my invention in its broader aspects is not limited to such automatic regulation.

While I have shown and described various embodiments of my invention, it will be obvious to those skilled in the art that further modifications are possible and I, therefore, aim in the appended claims to cover all such modifications and variations as fall within the spirit of my invention.

What I claim as new and desire to secure by Letters Patent of the United States, is:

1. An apparatus for electric arc welding comprising a hand tool, electrode feeding mechanism and a flexible tube for guiding an electrode from the feeding mechanism to the hand tool.

2. In an arc welding apparatus of the class described a welding tool, means adapted to feed an electrode continuously to the tool and a flexible tube arranged to guide the electrode from the feeding means to the welding tool.

3. In an arc welding apparatus of the class described a welding tool, a supply of electrode located at a distance from the welding tool, flexible means for guiding the electrode to the welding tool and means for continuously feeding the electrode from the supply through the welding tool.

4. An apparatus for electric arc welding comprising electrode feeding mechanism and a flexible tube secured in cooperative relationship to the feeding mechanism, to receive the electrode and guide it to the place where welding is to be done.

5. An apparatus for electric arc welding comprising electrode feeding mechanism, a flexible tube arranged to receive the electrode from the feeding mechanism and a nozzle through which the electrode is delivered to the work secured to the tube.

6. An apparatus for electric arc welding comprising electrode feeding mechanism, a welding tool adapted to be moved about the work independently of the position of the feeding mechanism, means for guiding the electrode from the feeding mechanism to the welding tool and means arranged to lead welding current into the electrode at the welding tool.

7. An apparatus for electric arc welding comprising electrode feeding mechanism, a motor for operating said feeding mechanism, a welding tool adapted to be moved about the work independently of the position of the feeding mechanism, means for guiding the electrode from the feeding mechanism to the welding tool, means arranged to lead welding current into the electrode at the welding tool, and means for controlling the operation of the motor in accordance with the voltage across the arc to maintain the arc at constant length during welding.

8. An electric arc welding system comprising a source of welding current, an electrode feeding mechanism, a welding tool, flexible means for leading the elctrode from the electrode feeding mechanism to the welding tool said flexible means and welding tool being arranged to conduct welding current from said source into the electrode at the welding tool.

9. An apparatus for electric arc welding comprising electrode feeding mechanism, a welding tool through which the electrode is adapted to be fed, an insulated flexible metallic tube for guiding the electrode from said feeding mechanism to the welding tool, means on said tool adapted to make good electrical contact with the electrode as it moves through the tool and a stranded conductor mounted on said tube and connected to lead the welding current to said contact making means.

10. An apparatus for electric arc welding comprising electrode feeding mechanism, a motor for operating said feeding mechanism, a welding tool through which the electrode is adapted to be fed, a flexible metallic tube for guiding the electrode from said feeding mechanism to the welding tool, a flexible conductor arranged to lead the welding current into the electrode at the welding tool, and means arranged adjacent the welding tool for controlling the operation of the motor operating the feeding mechanism.

11. An apparatus for electric arc welding comprising a flexible tube, a welding tool secured thereto through which tube and tool an electrode may be fed and means on the welding tool for conducting welding current to the electrode.

12. Apparatus for electric arc welding comprising electrode feeding mechanism, a manually portable tool comprising a body portion adapted to be manually supported and freely moved in any direction with reference to the work to be welded independently of the position of said feeding mechanism, said body portion being provided with an opening therethrough through which an electrode may be fed, and a steady rest mounted on and carried by said body portion for the purpose described.

13. A manually portable tool for electric arc welding comprising a tubular portion through which an electrode may be fed, a steady rest mounted on and carried by said tubular portion and means whereby the steady rest may be rotatably adjusted on the tubular portion.

14. A welding tool comprising a body portion having an opening therethrough, means adapted to secure one end of said body portion to a tube from which an electrode may be fed through said body portion, and contact means mounted in the body portion adapted to engage with and lead welding current into the electrode.

15. A welding tool comprising a body portion, means adapted to secure said body portion to a tube through which an electrode may be fed, a plurality of contact rolls mounted in the body portion for leading current into the electrode and means for biasing the contact rolls toward a position where they will make good electrical contact with the electrode.

16. A welding tool comprising a body portion, means adapted to secure one end of said body portion to a tube from which an electrode may be fed through said body portion, means on the tool for leading welding current into the electrode, and an electrode delivery nozzle secured to the body portion through which the electrode may be delivered to the work.

17. In an apparatus for electric arc welding, an electrode guide and current carrying device comprising a flexible insulated metallic tube through which an electrode may be moved, and a stranded conductor adapted to carry the welding current mounted upon said tube.

In witness whereof, I have hereunto set my hand this 26th day of July, 1921.

PAUL O. NOBLE.